United States Patent

[11] 3,603,184

[72] Inventor   Marcel Berly
                Garches, France
[21] Appl. No.  798,870
[22] Filed      Feb. 13, 1969
[45] Patented   Sept. 7, 1971
[73] Assignee   H. Ernault-Souma
                Paris, France
[32] Priority   Feb. 13, 1968
[33]            France
[31]            139,596

[54] CORRECTION DEVICE FOR MACHINE-TOOLS
     8 Claims, 7 Drawing Figs.
[52] U.S. Cl. .................................................. 82/14 A,
                                                        90/62
[51] Int. Cl. .................................................. B23b 3/28
[50] Field of Search .......................................... 90/13, 13.4,
                            62; 82/14, 14.1, 14.3; 51/100, 165

[56]                References Cited
            UNITED STATES PATENTS
2,592,812  4/1952  Le Lan ........................   51/165
2,676,507  4/1954  Le Brusque et al. ..........   90/62 X
3,427,906  2/1969  Berley ..........................   82/14
3,427,907  2/1969  Gajda et al. ..................   82/14
3,438,293  4/1969  Thorneycroft ...............   82/14

Primary Examiner—Gil Weidenfeld
Attorney—Waters, Roditi, Schwartz & Nissen

ABSTRACT: Apparatus and a process for correcting the position of a movable machine element which is positionally controlled by a permanent-circulation hydraulic servomotor copying-control system. Means are provided for measuring the positional error of the element and varying the rate of the liquid supplied to the hydraulic servomotor as a function of the positional error.

CORRECTION DEVICE FOR MACHINE-TOOLS

The present invention relates to the correction of position and, in particular, the autoadjustment or automatic adjustment of a moving element on a hydraulically controlled machine which is of prime importance in the total automation of machines.

The present invention will be described with reference to the autoadjustment of a tool-support carriage, in this instance a transverse tool-support carriage on a copying lathe, but it should be clearly understood that the invention is aimed, in a more general manner, at the autoadjustment of a moving machine element. The element is compelled by a hydraulic control to follow rigorously a predetermined law, the precise function of the autoadjustment being the correction by the said hydraulic control of the position of this element every time that an appropriate measuring unit finds that the position of the said element has deviated or is tending to deviate from the predetermined law or path due to the effects of some fortuitous cause such as wear, expansion or contraction due to heat, deformation or relative slipping of the parts, etc.

It is well known that cutting tools used on machines which operate by removing metal wear out progressively and that this wear has inevitable effects on the dimensions of the machined article. In addition, modifications in the geometric conditions of the machine may arise as a result of variations in temperature. All these disturbances, whether their origin be in the tool or the machine, must immediately be compensated for in order to ensure the dimensional stability of the article.

If the machine is operated by an operator the operator must systematically check the machined parts and intervene in the positioning of the tool or the tool-support organ in order to replace them in a new position compatible with manufacturing tolerances.

On the other hand, if the machine is automatic, it becomes essential to substitute some device to ensure checking of the parts and automatic compensation for any deviations ascertained.

From the technical point of view the automatic functioning of a machine therefore necessitates both autocontrol and autoadjustment of these functions.

With autocontrol the machined product, when ejected, passes on its own into a checking unit which signals the result(s) of the check. By autoadjustment, as soon as there is faulty measurement, or even a possibility of this happening, the control instrument causes, by retroaction, the automatic adjustment which is required to keep the product well within the dimensional limits demanded.

The present invention relates to a system for correction of position and, in particular, autoadjustment of a machine tool and more especially a machine tool provided with a hydraulic servocontrol serving to change the position of the element which is to be controlled and to regulate its positioning in order to satisfy the dimensioning required for the machined product.

Several processes for autoadjustment of machine tools are already known. Some utilize controlled movement of the tool or the tool support on its mounting.

Such a process is very difficult to put into practice since the machines work in continuous production or in a chain and therefore demand very high tool rigidity and rigidity of its mounting and attachments, so that any mechanical intervention in this field, especially if it has to be frequent, runs a great risk of lessening the rigidity of the assembly.

Another autoadjustment process consists of using a tool support fitted with a flexible part in the manner used on dynamometric tool supports and controlling this deformation by any physical effect appropriate, such as a rigorously controlled variation in temperature. Apart from the fact that the use of flexible or deformable tool holders runs counter to the desire for great rigidity, it must also be accepted that the use of thermal energy in a measuring process is considered damaging and the resultant instability is prejudicial to the maintenance of accuracy over the course of time.

All these processes which consist of acting on the power circuit of the tool, that is, on the elements directly subject to its compulsion, are therefore very difficult and even dangerous to put into practice because they risk affecting the essential stability of the tool.

Now the use of servocontrols for moving the carriages of machine tools has made it possible to use with the elements for information or control (usually working under little stress) the action of autoadjustment devices.

In a known application, use is made, for example, of the thermal energy already mentioned to deform the mechanical feeler of a copying unit and thus to change the touching position of the feeler in relation to the tool. Such an arrangement is very sensitive in its corrections but, apart from the great complexity in the means being used and notably the necessity to have available a heat generator, the reliability of such systems is poor. It will be recalled in this connection what was stated above for deformable tool holders, namely, that the thermal energy involved is damaging and that the resultant instability is prejudicial to the maintenance of the accuracy over the course of time.

A more refined machine has already been produced by the applicant (this machine being the object of French Pat. No. 1,305,563, filed on Aug. 24, 1961). In this machine the compensation for the dimensional deviations measured on the part is carried out by moving to a corresponding value the template which is mounted, to make this possible, on an oscillating support free of play. Operation is excellent but it does not prevent the mechanism for controlling displacement of the template from being quite complex and accordingly very costly to make.

An object of the present invention is to provide a system of autoadjustment which will be simple, of low cost, very accurate and reliable in all cases.

Another object of the invention is to create a simple system using elements which are not only very few in number but, moreover, already exist on the machine.

Another object consists of providing a system of autoadjustment capable of being fitted to an existing machine without in so doing necessitating the removal of elements other than, for example, replacing a certain electric motor with one of a different type.

The present invention provides a process for correcting the position of a movable machine element which is primarily controlled by a permanent-circulation hydraulic servomotor copying-control system, the process consisting of measuring the positional error of the element and varying the rate of the liquid supplied to the hydraulic servomotor as a function of the positional error.

The present invention also provides in a machine tool having a movable tool-carrying element which is primarily under the positional control of a permanent-circulation hydraulic servomotor copying-control system having a copying feeler and a single-throttle control valve, apparatus for correcting the position of the movable tool-carrying element including means for measuring the dimension of a workpiece machined in the machine tool, means for comparing the measurement of the dimension of the workpiece with an initial value of reference measurement to provide an error signal, means responsive to the error signal for controlling the rate of the liquid supplied to the hydraulic copying servomotor, means responsive to the error signal for modifying the reference measurement from the initial value until it is equal to the measurement of the dimension of the workpiece, and means for resetting the reference measurement to its initial value, without further altering the rate of the liquid supplied to the hydraulic copying servomotor.

It is clear therefore that the present invention is based on a principle entirely different from prior art known principles. It consists of a correction system which automatically ensures compensation for errors discovered on the workpiece without making it necessary to interfere with the positioning of the tool in relation to the carriage which guides it or even in the position of the copying template, but simply by altering the rate of supply of the liquid acting as drive for the copying servomotor. This change in supply rate can be made as a function of error signals transmitted by a measuring unit arranged either beside the machine or on the machine, if this is possible. These errors are due, as already pointed out, to tool wear or a variation of geometric nature occasioned by heating up of the machine or some chance disturbance. These error signals, in their amplitude and sense, are used in a system controlling the variation in the rate of supply of the liquid in the supply pipe to the copying servomotor. It will be seen that this correction is possible for any error of any dimension resulting from tool wear or variations in the geometry of the machine.

For full and complete exploitation of the process described hereinafter it will be advantageous to use a hydraulic copying servomotor such as that which was the object of French Pat. No. 1,056,787, filed Aug. 29, 1951, by the applicant. This hydraulic servocontrol is of the type in which the control liquid is in permanent circulation, as compared with other systems known as distribution systems. In comparison with these latter devices having a problem relating to a very considerable threshold of sensitivity or reversal of direction of travel, whereas the systems known as "permanent circulation" have the advantage of having a very low sensitivity threshold and enable the use of simple control valves with a single throttle which can attain a relatively small cross section which makes it possible to avoid all the disturbances normally encountered in control systems operating with low rates of supply of liquid, better known as "limit layers."

In the hydraulic servosystems of the so-called permanent circulation systems the control valve is usually formed from a cylindrical spool having an annular groove of rectangular cross section and reciprocably mounted in a corresponding cylindrical bore of a sleeve in which is machined another annular groove also of rectangular cross section. The sides of the grooves of the spool and of the sleeve thus juxtaposed determine a throttle whose cross section can be varied but whose operating principles can be compared with the principles which control the throttling openings called "thin-walled."

Now, in such throttlings, for a supply pressure which is constant, the aperture section is directly proportional to the rate of liquid passing through the throttle in a given time and inversely proportional to the square root of the fall in pressure caused by this throttling.

Conversely, it can be said that, for a given pressure drop, any variation in the liquid supply rate must result in a correlative variation in the value of the throttling and, consequently, the axial position of the spool in its holder.

It is precisely this displacement of the spool, as a function of a variation in the supply rate of feed liquid which is put to advantage in the present invention, because, due to the fact that the spool is operatively connected to the copying feller while the sleeve in which the spool is reciprocably movable is operatively connected to the tool-carrying slide (movable machine element), if the spool is shifted with respect to the sleeve the tool has to move since the feeler maintains engagement with the template.

The present invention will now be described, by way of example, with reference to the accompanying drawings, in which.

Figure 1:
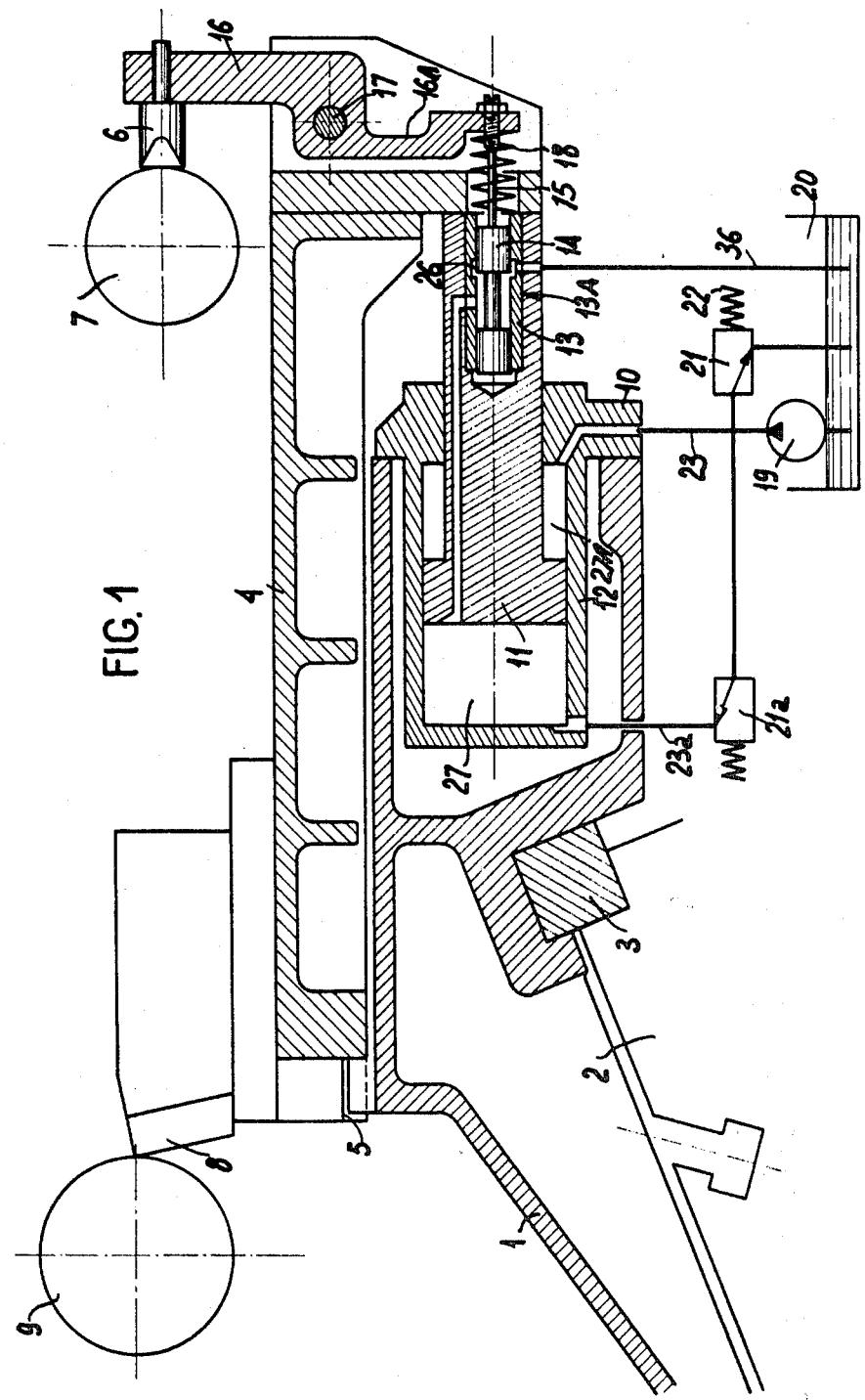
FIG. 1 is a cross-sectional elevation of the saddle and the transverse carriage of a copying lathe with its hydraulic jack and a diagram of the hydraulic control.

The hydraulically controlled copying lathe, partly shown in FIG. 1, comprises a saddle or structure 1 which can slide along two parallel slides of a bed 2, one slide 3 only being shown and a copying carriage 4 which can move on the saddle 1 in a direction transverse to that of the bed guideways by means of guideways 5.

The copying carriage 4 has both a feeler 16 fitted with a contact 6 for following a template 7 and a cutting tool 8 for machining a workpiece 9. The template 7 and the workpiece 9 are carried by the frame (not shown) of the machine by well-known elements.

The movements of the transverse carriage 4 on the saddle 1 are effected by a hydraulic jack 10 whose differential piston 11 is rigidly fixed to the transverse carriage 4 and whose cylinder 12 is secured to the saddle 1; the axis of the jack being parallel to the direction of the guideways 5 of the transverse carriage 4.

Control of the hydraulic jack 10 is effected by a control valve or copying valve 13A whose spool 14, mounted in a sleeve 13, is connected by a flexible metal rod 15, to an extension 16A of the feeler 16. The feeler 16 can pivot on pin 17 perpendicular to the direction of the guideways 5 of the transverse carriage 4 and carried on this carriage. Feeler 16 is urged against template 7 by a compression spring 18 interposed between the inner face of extension 16A of the feeler 16 and the corresponding end of the sleeve 13 rigidly fixed in the piston 11.

The hydraulic system comprises a feed pump 19, an oil reservoir 20, a safety valve 21 balanced by a spring 22. In order to maintain constant pressure in the main supply line 23 there is fitted, between the supply pipe 23a of the large chamber 27 of cylinder 12 and the pipe 23, a second safety valve 21a, or nonreturn valve whose calibration is adjusted to a pressure value lower than that provided for valve 21. Into the bore of the sleeve 13 of the copying valve 13A is machined an annular groove 26 in direct communication with the oil reservoir 20 by a return pipe 36.

In operation, the pump 19 feeds with oil the annular space 27A of the cylinder 12 through pipe 23. The pressure in this annular space is adjusted by means of the safety valve 21 calibrated by the spring 22. Oil is also fed to the chamber 27 through the safety valve 21a and pipe 23a. The pressure in the chamber 27 is controlled by the edge 24 (FIG. 2) of the copying valve 13A permanently urged towards its opening position by the spring 18. Subsequently, the oil is returned to the reservoir 20 through pipe 36.

As soon as pump 19 is started, the oil pressure in the annular space 27A pushes piston 11 and consequently the tool-carrying carriage 4 toward the left in FIG. 1, that is to say toward the template 7.

Upon engagement of contact piece 6 with the template 7, the feeler 16 is tilted and through its lower arm pushes the spool 14 whose edge 24 (FIG. 2) throttles the return oil passage 26 to the reservoir 20, so that the pressure rises in chamber 27. The movement stops as soon as the effective pressures on the two faces of the piston 11 are balanced. Any inducement of the template 7 upon the feeler 16 will result into a movement of the spool 14 of valve 13A which, in modifying the pressure in chamber 27, will cause a corresponding displacement of the carriage toward the right or toward the left.

Figure 2:
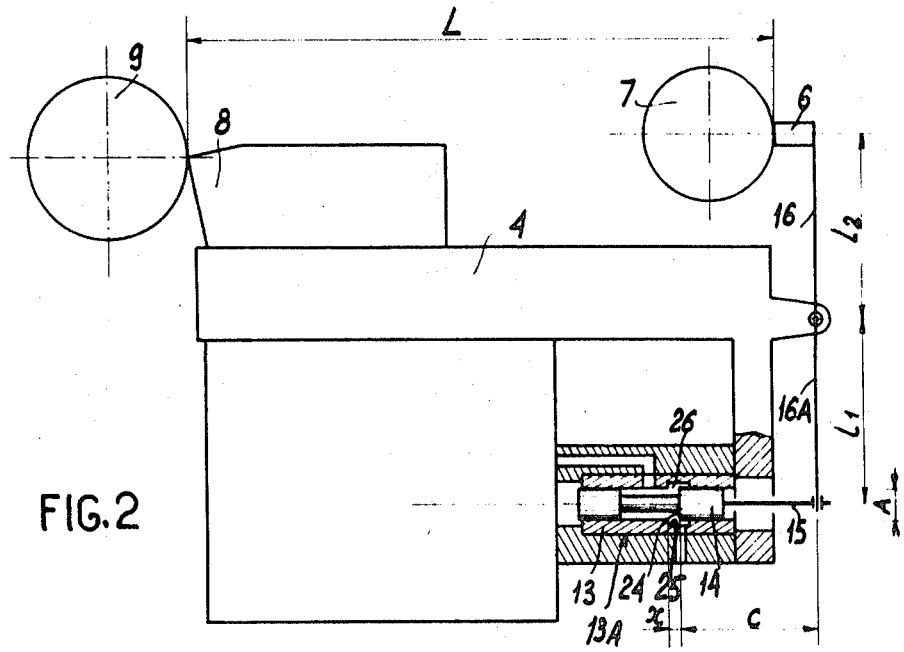
FIGS. 2 and 3 are schematic representations of the device of FIG. 1, respectively before and after correction of the position of the tool.
Figure 3:
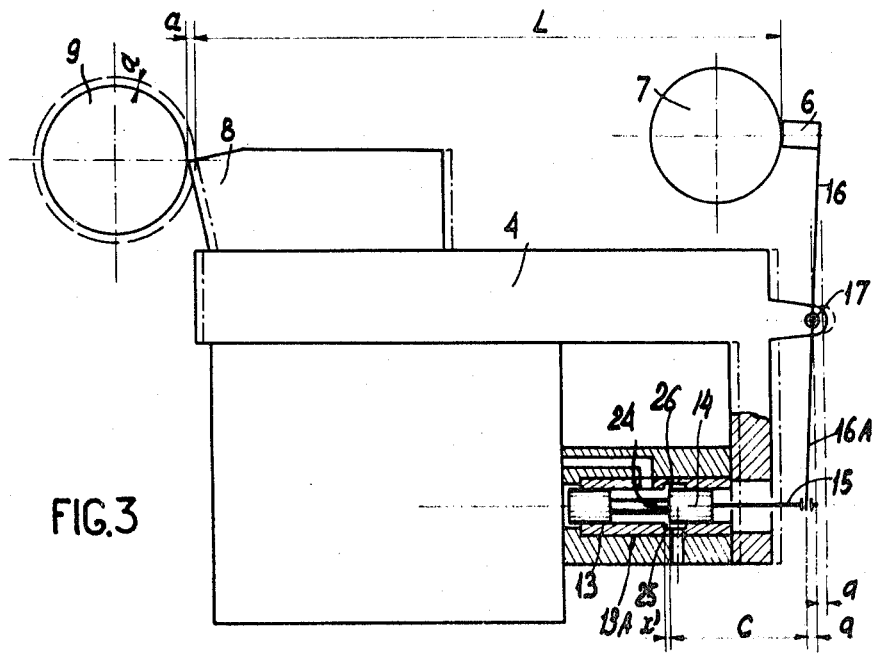

An explanation of how the position of the tool 8 relative to the contact 6 is corrected by altering the rate of oil supply to the copying servomotor is now presented. In FIGS. 2 and 3 there is a schematic drawing of the main elements just described. FIG. 2 shows their position when the transverse carriage occupies a certain position before correction of the position of the tool 8, while FIG. 3 shows the same set of parts, after correction.

In FIG. 2 all the elements are shown in a position corresponding to the position of equilibrium called "stop on templete," tool 8 being in contact with the workpiece 9 and the contact 6 of the feeler being in contact with the template 7. The spool 14 of the copying valve 13A is located in a position of hydraulic equilibrium in which the annular face 24 of the spool is at a distance "x" from the leading edge 25 of the groove 26 of the sleeve 13. For purposes of illustration, it is assumed that pin 17 of the lever 16 which pivots on the transverse carriage 4 is situated at an equal distance from the ends of the feeler 16 and its extension 16A in the middle of the length of the said lever: $l_1=l_2$.

The letter "L" designates the distance between the tip of the tool 8 and the point of contact of the contact 6 against the template 7.

It is assumed that, after a certain period of operation, for some reason, the workpiece shows an increase in its diameter of 2a (FIG. 3) which is observed by measuring the piece by means which will be mentioned later.

To carry out the correction necessary, it is therefore essential that the carriage should move towards the piece through a value "a" from right to left (in FIG. 2) to resume a position which would bring the tip of the tool to its starting position. In FIG. 3, the new position of the carriage is shown by solid lines while the dotted lines show the position in FIG. 2 — the same is true for the workpiece before and after correction. It will also be noted that the distance from the face 24 to the leading edge 25 has now become $x'$. Now, in the present construction, we have:

$x+c=x'+c+a$, from which $x'=x-a$, which modifies the flow area in the throttle. Given that the opening section has changed it is now necessary to look for a new state of hydraulic equilibrium, which is possible by changing the supplied rate of oil, as will be seen in the numerical example which follows.

In this example, assume: $P_1=30$ bars, the effective pressure of the oil in the main supply pipe 23 and in the small chamber 27A (FIG. 1).

$S_1=32$ cm.$^2$, the annular surface of the small chamber 27A.

$S_2=64$ cm.$^2$, the circular surface of the large chamber 27.

$Q=10$ litres/min., the output of the feed pump 19.

$K=1.25$, a numerical coefficient which depends on the characteristics of the oil used and its temperature.

$D=16$ mm., the diameter of the bore of the sleeve 13 of the copying valve.

$Su$ = the flow area in the throttle which corresponds to the lateral surface of a cylinder of height $x$ and diameter 16 mm. (FIG. 2).

On the basis of these details, the force applied to the piston 11 in the small chamber 27A is $F_1=P_1S_1=30\times32=960$ kg.; the force applied to the piston in the large chamber 27 must be equivalent so that there will be equilibrium at the stop position on the template, so $F_2=F_1=960$ kg. with the result that the unit pressure in the large chamber is $P_2=F_2/S_2=960/64=15$ bars. The fall in pressure in the throttle is $dP=P_1-P_2=30-15=15$ bars. Knowing then the value of the drop in pressure one can find the flow area of the throttle by the formula for the flow of fluids in throttles: $Se=KQ/\sqrt{dP}=1.25\times10/\sqrt{15}=3.227$ mm.$^2$; from which one deduces the value of $x=Se/\pi D=3.227/\pi16=0.064$ mm.

It has already been said that after measuring a workpiece it was noted that there was increase in its diameter equal to $2a$. If, for this example, it is supposed that $2a=0.04$ mm., then, as a result, the correction $x-x'=a$ must be 0.02 mm. and $x'=0.064-0.02=0.044$ mm. The flow area of the throttle becomes $sE'=x'\pi D=0.044\times\pi16=2.211$ mm.$^2$. To reestablish the conditions of equilibrium, without however changing the regulation of the pressure, the correction will be obtained by altering the rate supply of oil which will have to be $Q'=Se'\sqrt{dP}/1.25=2.211\times\sqrt{15}/1.25=6.85$ l./min.

The figures given above are shown only as examples and could naturally be modified to show the full sensitivity of this means of correction. It will be noted, in this connection that an alteration in rate supply of $10-6.85=3.15$, that is, more than 30 percent of the initial supply, enables the position of the tool to be corrected to a very small value, namely 0.02 mm.

In the above it has been assumed that what had happened was due to wear in the tool, but is is worth stating that the system described automatically ensures, at the same time, compensation of any variations in the length of the transverse carriage due to the effect of deformations which may arise, particularly thermal expansions. Thus any lengthening of the carriage leads to a fault in the diameter of the piece 9 and, as a result, to a drawing back of the carriage 4 by increasing the rate of oil supplied to the copying servomotor to bring the tool back to the position which it should have in relation to the workpiece, whatever may be the reason for deviation.

The installation for automation of the correction or autoadjustment system can be easily integrated into the operating cycle of the machine. In the embodiment shown in FIG. 4, the installation is basically composed of a measuring set 28 which measures one of the diameters of the workpiece 9, an amplifying comparator 31, a current rectifier unit with a supply transformer 32, a variable speed DC motor 33 controlling the oil-supply pump 19, and a tachogenerator 34 providing feedback voltage which, opposed to the voltage supplied by the amplifier comparator 31, is used to control unit 32. The alternating current supply to unit 32 and the amplifier comparator 31 is provided through a line 35.

The measuring set 28 is fitted with a contact piece 29 in contact with the machined part 9 which is placed on appropriate supports 30 belonging, for example, to an automatic unloading system for the machine. These supports could, in any case, be eliminated in the case where measurement of the error was made directly on the machine, for example, when the workpiece is still between centers.

The error signal, in amplitude and sign, is transmitted by the measuring unit 28 to the amplifier comparator 31 which amplifies and compares this signal with the setting of a law of variation which is a function of the correction to be obtained. The output of the amplifier comparator is connected to the current rectifier, varying, if necessary, the DC supply to motor 33. The tachogenerator 34, driven by this motor, produces a feedback voltage which aims at reestablishing the equilibrium in the comparison circuit. When this equilibrium is achieved the variation in speed of the motor ceases and normal operation is resumed in order to maintain the new oil rate.

In a modification, it would be possible, for example, to replace the DC motor by an induction motor supplied by a frequency changer or by any other known system. In another modification the oil-supply-rate pump might be a volumetric pump with variable output controlled by a constant-speed motor, the control device for varying the output of this pump then being under the control of the amplifier comparator. In this case the voltage would no longer be supplied by a tachogenerator but by a system connected to a volumetric counter measuring the output.

The detection of the errors can be carried out in several ways. In the case where use is being made of a single tool for copying, one measuring unit is sufficient to measure, for example, a particular diameter of the workpiece. But in the machining of certain parts having quite complicated profiles which are difficult and even impossible to be carried out by a single tool, it is absolutely essential to use several tools whose particular operation corresponds to the different portions to be machined on one piece. In this case the system will have several measuring sets, coordinated with the various tools, in order to carry out detection of the errors particular to each.

Figure 5:
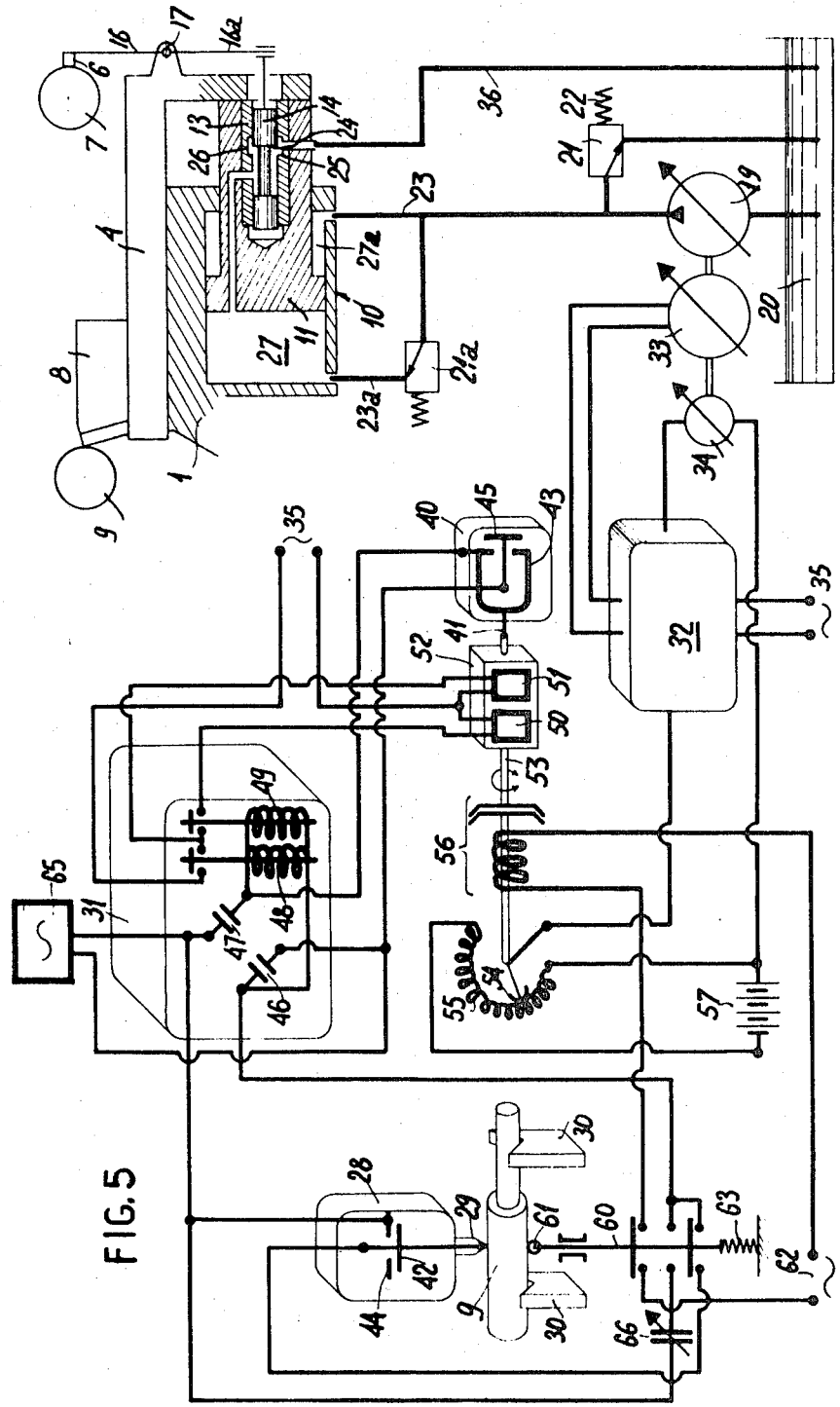
FIG. 5 is a diagram of electrical equipment used in the embodiment of FIG. 4.

The autoadjustment system of the tool-support carriage position is shown in more detail in FIG. 5.

Figure 4:
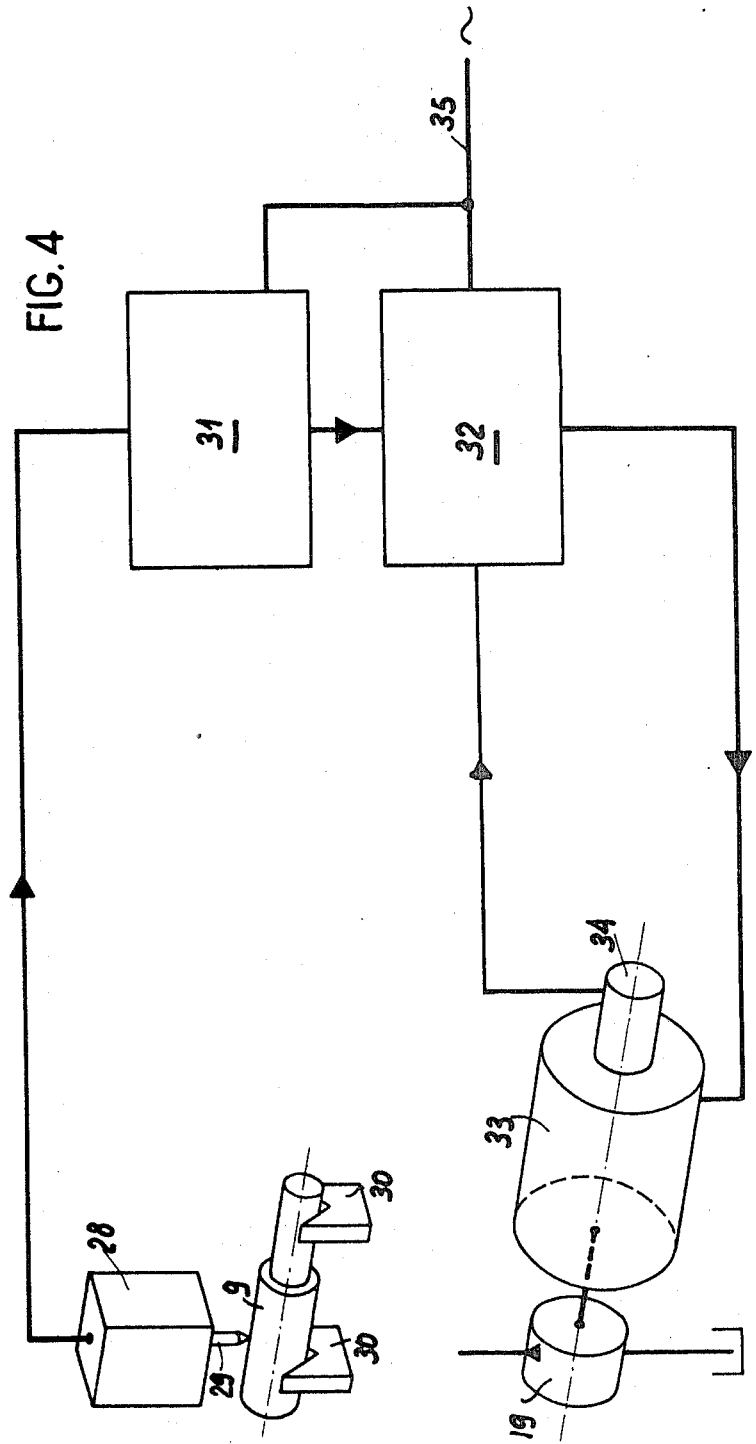
FIG. 4 is a schematic representation of an embodiment of an autoadjustment device according to the present invention.

In FIG. 5 will be found, with the same reference figures, the essential elements of FIG. 1 and FIG. 4. It has been stated that the error signal transmitted by the measuring unit 28 to the amplifier comparator 31 is, in this amplifier comparator, amplified and compared to a setting of a law of variation which is a function of the correction to be obtained. This setting is here made by a measuring unit 40 basically comprising a variable condenser to which we will return later.

Thus the signal from the measuring units 28 and 40 are amplified and compared in the amplifier comparator 31, the effect of the comparison being to determine the stopping of the action of the correction device as soon as the tool 8 has taken up the position appropriate for compensating for the dimensional error measured on the workpiece by unit 28.

A control for resetting measuring unit 40 to zero operates in such a way that this unit does not give any signal when, after correction of the position of the tool by modifying the oil rate setup in the hydraulic system, the defective part 9 is replaced by a piece whose dimensions are accurately correct.

Whereas unit 28 is of the rectilinear control type and is provided with a contact piece 29 which feels the piece 9 directly, unit 40 is of the rotary control type and provided, therefore, with a shaft 41.

The contact piece 29 and the shaft 41 are linked respectively to movable members 42, 43 of variable capacitors whose fixed members are shown by 44, 45 respectively. These two capacitors are placed in two branches of a Wheatstone bridge for electrical comparison whose other two branches have two fixed capacitors 46 and 47.

Relays 48 and 49 with different trip thresholds are placed on a diagonal of the bridge and are therefore supplied by the error voltage produced by the imbalance of the capacitors. These relays 48 and 49 supply, according to the sense of this error voltage, one or other of two motors 50 and 51 arranged in the motor unit 52 and turning in opposite directions due to their respective supply currents.

The motor unit 52 therefore serves both to transmit to the measuring unit 40 the amount of correction to be made to the device and to return to zero the said measuring unit, as later described.

One of the ends of the single shaft 53 of the motor unit 52 is therefore coupled to shaft 41 of the movable member 43 of the variable capacitor 43, 45, while the other end can be linked to the slider 54 of a potentiometer 55 through an electromagnetic clutch 56 placed between the shaft 53 and the shaft of the slider 54.

The potentiometer 55 is powered by a current source 57. It is connected, on one hand, to unit 32 and, on the other, to the tachogenerator 34 in such a way that the voltages supplied respectively by the potentiometer and the tachogenerator are fed in opposition to unit 32.

A contactor 60, operated by a feeler 61 pushed back by piece 9, when the latter is in the control position, determines the choice of action carried out by the relays 48 and 49 in the following manner.

The pushing back of feeler 61 has the following effect: first, it supplies power to the electromagnetic clutch 56 through a current source 62, then it connects the measuring unit 28 to the amplifier 31 and thus permits current to pass to motors 50 and 51 by the action of relays 48 and 49. The motors 50 and 51 act both on the control of the measuring unit 40 and the rotation of the cursor 54 of the potentiometer 55.

When piece 9 is removed the feeler 61 is pushed back by a spring 63, thus cutting off the supply of the electromagnetic clutch 56. However, and as will be seen later, motors 50 and 51, still connected to relays 48 and 49 and still connected to the measuring unit 40, can then be utilized for resetting this unit to zero.

A high-frequency AC generator 65 supplies the bridge 31 for control of the relays 48 and 49, while various connections 35 to the mains serve respectively to supply the motors 50 and 51, as the case may be, and the current rectifier unit with supply transformer 32.

The operation of the device is as follows:

With a workpiece 9 placed on the supports 30 the contactor 60 introduces into the circuit of the comparison bridge 31 the capacitor 42, 44 and also powers the electromagnetic clutch 56. If the capacitances of the capacitor 42, 44 and the capacitor 43, 45 are identical no power appears at the terminals of the relays 48 and 49. The checked piece is therefore identical with the sample piece for which the device has been calibrated and nothing is modified in the oil supply to the hydraulic copying device.

If, on the other hand, the two capacitances are different, a voltage appears at the terminals of the relays 48 and 49. Depending on the value of this voltage one or other of the relays 48 or 49 is closed and supplies the appropriate motor 50 or 51. This motor rotates in the direction necessary for correction, driving at the same time the movable member 43 of the unit 40 and the slider 54 of the potentiometer 55.

The rotation of the potentiometer 55 has the result of varying its output voltage and, in so doing, breaking the equilibrium established in the whole unit 32 with the voltage generated by the tachogenerator 34. This upsetting of voltage balance is amplified by the unit 32 and used, in turn, to modify the supply current to the motor 33 of pump 19, and in so doing, as already described above, correcting the value of the throttle constituted from the side 24 of the slide 14 and the leading edge 25 of the holder 13.

When the capacitance of the capacitor 43, 45 becomes equal to that of capacitor 42, 44 the resulting voltage in the bridge becomes nil. The relay 48 or 49 is deactivated and the corresponding motor 50 or 51 stops.

After removal of workpiece 9 in the course of checking, contactor 60 now being free, the condenser 42, 44 no longer intervenes and is replaced, in the comparison bridge, by a capacitor 66 whose value has previously been brought into line with that of the capacitor 42, 44 when the device was calibrated to the sample piece.

It is therefore appropriate now to reestablish the original equilibrium in the bridge for the next check. The position of the spool 14 in sleeve 13 having, in fact, been adjusted to obtain a piece with accurate dimensions, this position must be maintained until the next check unless external circumstances such as tool wear, for example, necessitate a new modification of this position.

The reset to zero of the measuring unit 40 will take place automatically and in simple manner by movement of the movable member 43 controlled by one of the motors 50 or 51.

In fact, the introduction of the capacitor 66 into the bridge 31 has determined the voltage for an error and, as a result, action by one or other of the two relays 48 and 49 according to the size of this voltage. The closed relay then feeds one of the two motors for resetting to zero of unit 40 without in so doing altering the position of the potentiometer which is isolated from the motor by the disengaging of the electromagnetic clutch 56.

It is therefore a matter of changing the reference of the measuring unit 40, the zero of this unit always having to correspond to the value of the throttling of the valve of the copying device necessary to obtain an accurate measure of the piece being machined. In this position the capacitors 43, 45 on one hand and 66 on the other are identical and the voltage at the terminals of the relays 48 and 49 is nil.

The embodiment just described could, of course, be modified in detail. For example, one could replace the capacitors by resistances or magnetic circuits.

Alternatively, and keeping the same basic scheme, one could replace the electrical apparatus by equivalent pneumatic systems, hydraulic or even completely mechanical ones.

Figure 6:
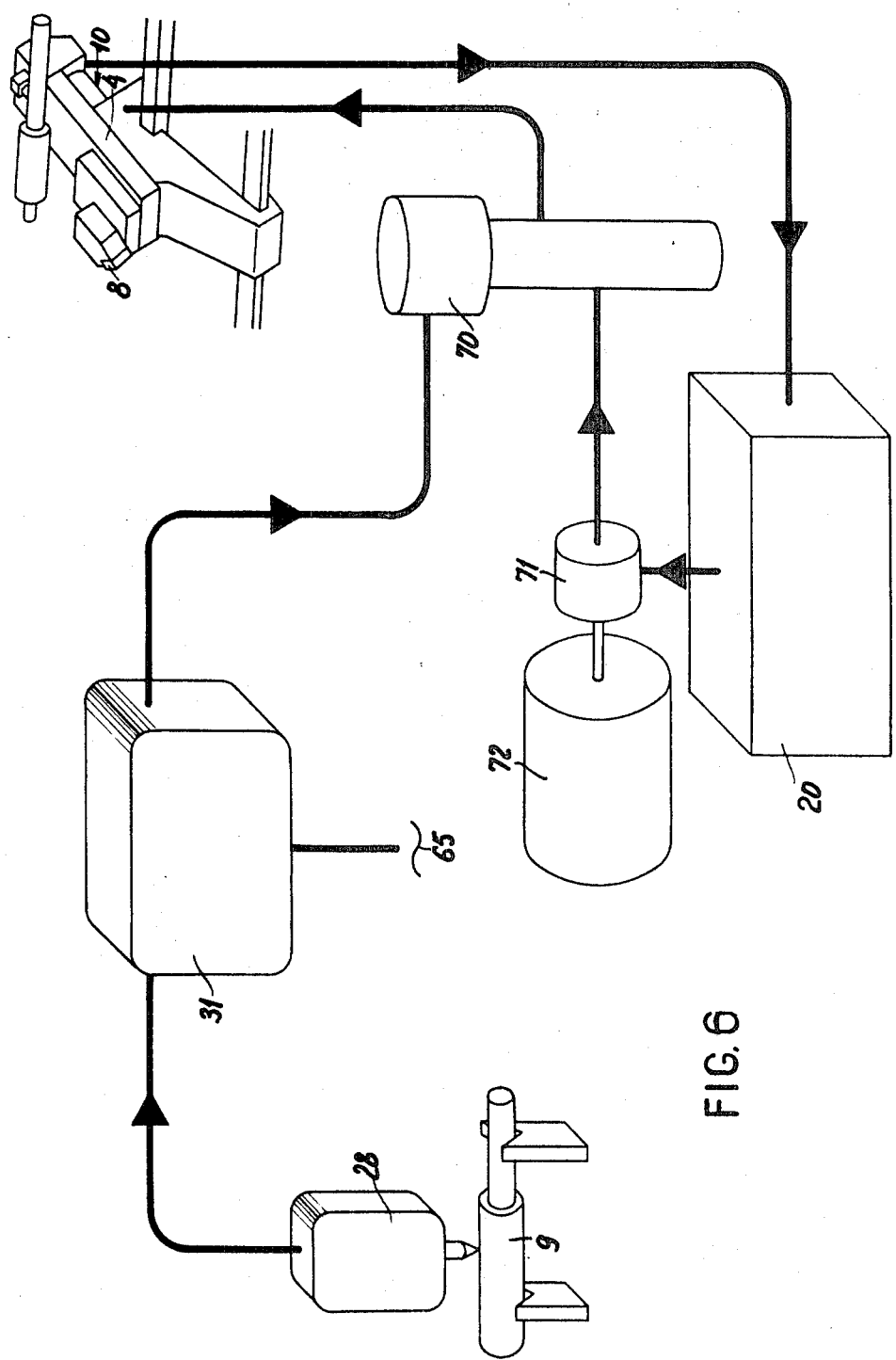
FIG. 6 is a schematic representation of another embodiment which is a modification of the embodiment of FIG. 4.
Figure 7:
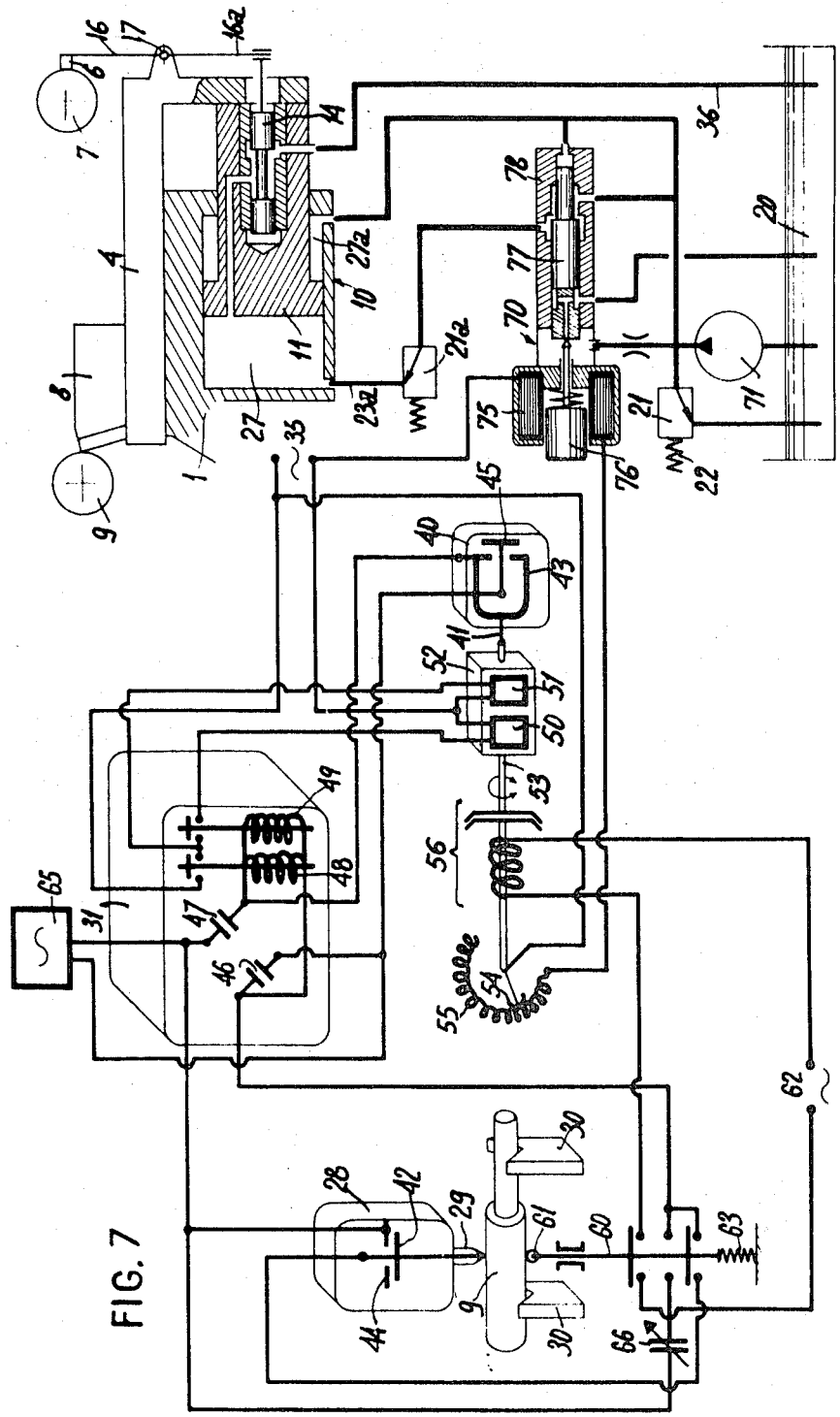
FIG. 7 is a diagram of electrical equipment used with the embodiment of FIG. 6.

In another embodiment shown in FIGS. 6 and 7 the variable-output hydraulic pump has been replaced by a constant-output pump of which use is made of a fraction only, but this can naturally be varied to provide the supply to the hydraulic copying device.

In FIG. 6 will be found measuring unit 28 for one of the diameters of the piece 9, and the amplifier comparator 31 whose function is still to compare the value measured by unit 28 with a calibrated value, then to signal a variation law which is a function of the correction to be obtained. This variation law is used for providing the information to a servovalve 70 arranged between the outlet of a constant-output pump 71 driven by a constant-speed motor 72 and the supply circuit of the hydraulic servomotor 10 of the copying carriage 4.

The role of the servo valve 70 is to modulate the supply rate to the servocontrol by using the information received from the amplifier comparator 31 in order to correct the position of the copying carriage 4 and the tool 8 to obtain a piece of accurate dimensions according to the process already described.

In FIG. 7 which is an electrical diagram similar to that in FIG. 5 but corresponds to the embodiment of FIG. 6, will be found the same elements already described, namely: the measuring unit 28, the measuring bridge 31 with its relays 48 and 49, the measuring unit 40, the motor unit 52, the electromagnetic clutch 56 and the potentiometer 55. The difference from the embodiment already described primarily resides in the application now made of the voltage collected at the terminals of the potentiometer.

This voltage is fed to coil 75 of the servo valve to control the position of the movable core 76 used itself to servocontrol the position of the spool 77 which can move inside the sleeve 78.

Any modification of the voltage registered at the terminals of the potentiometer 55 by the action of one or other of the motors 50 and 51 has the effect of varying the position of the spool 77 and consequently the rate of fluid to the hydraulic servomotor 10 through the nonreturn valve 21a and the pipe 23a.

Apart from this particular method of application of the voltage at the terminals of the potentiometer 55, which is an essential feature of this variation, the operation of the device remains identical to that just described.

Naturally the autoadjustment according to the invention, based on the principle of varying the rate of fluid supplied to a hydraulic copying servomotor is not limited to the embodiments described and illustrated, and it can undergo numerous modifications, depending on the applications envisaged, without in so doing going beyond the scope of the invention.

Thus, for example, one could apply it to milling machines or other copying tools and even, in a more general manner, to any machine element which has to be forced to follow, rigorously, by hydraulic control, a predetermined law.

Thus, although the invention has been described with particular reference in the above passages to an autoadjustment system, which is the most advanced method for work on an automatic machine, it is clearly understood that the process of the invention is equally applicable to the "manual" correction of the tool positions in order to take into account, for example, the wear of the tool or any thermal expansions.

In this case the operator checks the dimension of the pieces at the comparator and, where there is a deviation, all he has to do is to alter the rate of liquid supplied to the hydraulic copying servomotor. Use can be made of a check list of the corrections obtained as a function of the variations in fluid supply rate.

I claim:

1. In a machine tool having a structure, a copying-control system and a tool-carrying element movable with respect to said structure and primarily under the positional control of said copying-control system, said copying-control system including a permanent circulation hydraulic servomotor, a template and a feeler movable against said template, said permanent circulation hydraulic servomotor having a first member, a second member movable with respect to said first member and a single-throttle control valve operatively connected to said feeler to control said permanent circulation, said first member being operatively connected to said structure while said second member is operatively connected to said movable machine element; apparatus for correcting the position of said movable tool-carrying element comprising means for measuring the dimension of a workpiece machined in said machine tool, means for providing an adjustable reference measurement for comparison with the workpiece measurement, means for comparing the measurement of the dimension of the workpiece with an initial value of an the adjustable reference measurement to provide an error signal, means responsive to said error signal for controlling the rate of supply of the liquid to said hydraulic servomotor, means responsive to said error signal to adjust said reference measurement from said initial value until it is equal to said measurement of the dimension of the workpiece, and means for resetting said reference measurement back to said initial value without further altering the rate of the liquid supplied to said hydraulic copying servomotor.

2. Apparatus as claimed in claim 1 in which said control valve is of the type having a spool reciprocably mounted in a sleeve, said spool being operatively connected to said copying feeler while said sleeve is secured to said movable tool-carrying element.

3. Apparatus as claimed in claim 2 further comprising motor means and a clutch, wherein said means for modifying said reference measurement is coupled to said motor means which acts in response to said error signal and is coupled through said clutch to said means for controlling the rate of the liquid supplied to said hydraulic copying servomotor.

4. Apparatus as claimed in claim 3 in which said means for resetting said reference measurement back to said initial value includes means for substituting a calibrated measurement for said measurement of the dimension of the workpiece and for disengaging said clutch.

5. Apparatus as claimed in claim 1 wherein said hydraulic servomotor copying-control system includes a supplying pump and a motor driving said pump and wherein said means for controlling the rate of supply of liquid is a variable-speed control for said motor.

6. Apparatus as claimed in claim 5 including second comparing means adapted to control the speed of said motor and a tachogenerator driven by said motor, and wherein said error signal is a voltage applied in said second comparing means compared against the voltage produced by said tachogenerator.

7. Apparatus as claimed in claim 1 including a constant-output hydraulic pump, and in which said means for controlling the rate of supply of the liquid is a hydraulic control valve interposed between said pump and the hydraulic copying servomotor.

8. Apparatus as claimed in claim 7 in which said hydraulic control valve is an electrically actuated servo valve operated by said error signal.